United States Patent [19]
Cooley

[11] Patent Number: 5,714,574
[45] Date of Patent: Feb. 3, 1998

[54] PROCESS FOR PREPARING POLYKETONES

[75] Inventor: Neil Andrew Cooley, Teddington, United Kingdom

[73] Assignee: BP Chemicals Limited, London, England

[21] Appl. No.: 170,172
[22] PCT Filed: Jul. 3, 1992
[86] PCT No.: PCT/GB92/01205
§ 371 Date: May 2, 1994
§ 102(e) Date: May 2, 1994
[87] PCT Pub. No.: WO93/01224
PCT Pub. Date: Jan. 21, 1993

[30] Foreign Application Priority Data

Jul. 4, 1991 [GB] United Kingdom ............... 9114488

[51] Int. Cl.$^6$ .................................................. C08G 67/02
[52] U.S. Cl. .......................... 528/392; 528/392; 524/755; 524/765; 524/770; 524/785; 502/150
[58] Field of Search ................. 528/392; 502/150; 524/755, 765, 770, 785

[56] References Cited

U.S. PATENT DOCUMENTS

| | | | |
|---|---|---|---|
| 3,689,460 | 9/1972 | Nozaki | 528/392 |
| 3,694,412 | 9/1972 | Nozaki | 528/392 |
| 4,810,774 | 3/1989 | Drent . | |
| 4,835,250 | 5/1989 | Drent | 528/392 |
| 4,877,860 | 10/1989 | van Broekhoven et al. . | |
| 4,925,918 | 5/1990 | Brown et al. | 528/392 |
| 5,026,674 | 6/1991 | Brown et al. | 502/154 |

FOREIGN PATENT DOCUMENTS

| | | |
|---|---|---|
| 314309 | 5/1989 | European Pat. Off. . |
| 0332018 | 6/1989 | European Pat. Off. . |
| 322018 | 6/1989 | European Pat. Off. . |

*Primary Examiner*—Samuel A. Acquah
*Attorney, Agent, or Firm*—Brooks Haidt Haffner & Delahunty

[57] ABSTRACT

A process for preparing a polyketone is disclosed. This comprises polymerising together carbon monoxide, ethylene and optionally at least one $C_3$ to $C_{10}$ alpha-olefin in the presence of a solvent and a catalyst composition derivable from a palladium salt, an anion which is either non-coordinating or weakly coordinating to palladium and a phosphate ligand characterised in that the solvent is either a $C_4$ to $C_{10}$ tertiary aliphatic alcohol or a mixture of a $C_4$ to $C_{10}$ tertiary alcohol and up to 80% by volume of an aprotic solvent. The preferred tertiary alcohols are tertiary butyl alcohol and tertiary amyl alcohol. The aprotic solvents can be an aliphatic ketone or cyclic aliphatic ether; preferred aprotic solvents are THF and 1,4-dioxane.

21 Claims, No Drawings

PROCESS FOR PREPARING POLYKETONES

The present invention relates to a process for preparing polyketones by reacting one or more olefins with carbon monoxide in the presence of a palladium catalyst. In particular the invention relates to the use of certain preferred solvents in which the process is carried out. Polyketones are potentially useful polymers from which a wide range of plastic containers and packaging materials may be fabricated.

It is known to produce polyketones, which are linear alternating polymers of (a) one or more olefins and (b) carbon monoxide, by a liquid phase process in which the olefins(s) and carbon monoxide are polymerised together in methanol, ethanol or propanol solvent in the presence of a palladium catalyst. Such a process, which is disclosed in more detail in for example EP 121965 and EP 314309, typically employs a catalyst derived from (a) a palladium compound (b) a source of an anion which is either non-coordinating or only weakly coordinating to palladium and (c) a bisphosphine of formula $R^1R^2P$-R-$PR^3R^4$ where $R^1$ to $R^4$ are independently aryl groups which can optionally be polar substituted and R is a divalent organic bridging group such as —$(CH_2)_n$— (n=2 to 6). The source of the anion is typically its conjugate acid.

From U.S. Pat. Nos. 4,810,774 and 4,877,860 it is known that in such processes the molecular weight of the product is inversely proportional to the reaction temperature. As a consequence, in order to prepare products of acceptable molecular weight it is necessary to work at relatively low temperatures where the rate of polymerisation is relatively slow.

U.S. Pat. No. 4,810,774 teaches that an increase in the molecular weight of the polyketone product can be obtained by replacing at least part of the methanol, ethanol or propanol solvent by an aliphatic ketone having up to 10 carbon atoms, an aliphatic carboxylic acid ester or an aliphatic hydrocarbon. However, the use of such solvents systems is in general accompanied by a decrease in the rate of polymerisation and a fall in the bulk density of the polymer.

U.S. Pat. No. 4,877,860 teaches that improved rates of polymerisation for high bulk density polymers can be obtained using a ketone/alcohol mixture having more than 50% by volume of aliphatic ketones having at most 10 carbon atoms and more than 5% by volume of an aliphatic alcohol having at most 10 carbon atoms. Whilst, the primary or secondary alcohol/ketone mixtures disclosed therein go some way to solving this problem it remains an objective to further improve the polymerisation rate for a given molecular weight of product.

EP 322018 teaches that, when copolymerisation of a $C_3$ to $C_{10}$ olefin and carbon monoxide is effected, a preferred solvent system comprises (a) at least 75% by volume of either an aliphatic tertiary alcohol or an aromatic hydrocarbon having up to 10 carbon atoms and (b) at least 5% by volume of one or more aliphatic primary alcohols having up to 10 carbon atoms. However, Example 6 of this patent application teaches that when tertiary butanol is used in the absence of the other components of the solvent system no polymerisation occurs.

It has now been found that when polymerising carbon monoxide with mixtures of ethylene and at least one $C_3$ to $C_{10}$ alpha olefin at a given temperature, high molecular weights and good reaction rates can be obtained by using a solvent comprised of a $C_4$ to $C_{10}$ tertiary aliphatic alcohol optionally admixed with up to 80% by volume of a $C_3$ to $C_{10}$ aliphatic ketone or $C_4$ to $C_{10}$ cyclic aliphatic ether. Furthermore, it has been found that solvent systems containing a tertiary alcohol are superior to those disclosed in U.S. Pat. No. 4,877,860.

According to the present invention there is provided a process for preparing a polyketone comprising polymerising together carbon monoxide, ethylene and optionally at least one $C_3$ to $C_{10}$ alpha-olefin in the presence of a solvent and a catalyst composition derivable from a palladium salt, an anion which is either non-coordinating or weakly coordinating to palladium and a phosphine ligand characterised in that the solvent is either one or more $C_4$ to $C_{10}$ tertiary aliphatic alcohols or a mixture of one or more $C_4$ to $C_{10}$ tertiary alcohols and up to 80% by volume of one or more aprotic solvents such as a $C_3$ to $C_{10}$ aliphatic ketone or a $C_4$ to $C_{10}$ cyclic aliphatic ether.

The solvents of the present invention have the advantage over, for example, pure methanol that equivalent molecular weights (which are known to be inversely proportional to the reaction temperature under any given conditions) and equivalent reaction rates can be obtained at a higher temperature. This is an advantage on a commercial scale because the exothermic nature of the polymerisation reaction makes it difficult to maintain low reactor temperatures. Moreover, the use of tertiary alcohols of the present invention have the advantage over the primary and secondary alcohols in solvent systems disclosed in U.S. Pat. No. 4,877,860 in that higher reaction rates and molecular weights are obtained. In addition, the solvents of the present invention have the advantage that they do not require the presence of an oxidant to obtain optimum catalyst activity.

By the term polyketone is meant a linear polymer comprised of alternating —CO— and —X— units where X is either —$CH_2CH_2$—, in the case where carbon monoxide and ethylene are copolymerised or a statistical mixture of —$CH_2CH_2$— and —$CH_2CH(R)$— (R=$C_1$ to $C_3$ alkyl, phenyl or methyl or ethyl substituted phenyl) in the case where carbon monoxide, ethylene and at least one $C_3$ to $C_{10}$ alpha-olefin are terpolymerised. It is preferred that the process of the present invention is used to prepare polyketones of the later composition and in particular that the polyketones are those prepared from carbon monoxide and mixtures of ethylene and $C_3$ to $C_6$ alpha olefins. Most preferred of all are those materials prepared from carbon monoxide and mixtures of ethylene and propylene.

For the preferred polyketones, it is preferred that at least 70 mole % of the —X— units are —$CH_2CH_2$— most preferably 80 mole %. The exact composition of the polyketone can be adjusted by making appropriate changes to the relative proportions of the reactants employed.

The purity of the carbon monoxide used is not especially critical although it is preferred that it contains less than 20% by volume of other gases such as hydrogen.

Turning to the catalyst, whilst it is believed that the source of palladium is not critical it is preferred to use a palladium carboxylate salt e.g. palladium acetate, palladium propionate or palladium acetoacetonate. Sources of palladium containing strongly coordinating anions or ligands, e.g. palladium halides, can be used as precursors provided that the strongly coordinating anions or ligands are removed from the catalyst composition before use.

Component (b) of the catalyst composition is an anion which is either non-coordinating or only weakly coordinating to palladium. Typical examples of such anions are (1) the conjugate bases of acids having a pKa of less than 2 as measured at 25° C. in water with the exception of hydrogen halides (EP 121965) or (2) the borate anions disclosed in EP 314309. Examples of suitable anions include para-toluenesulphonate, trifluoracetate, difluoroacetate, tetafluoroborate and borate anions of the type described in EP 314309.

As regards the phosphine, whilst this can include simple phosphines such as $C_1$ to $C_{10}$ trialkylphosphines, $C_6$ to $C_{10}$ triarylphosphines and the like it is preferred that the phosphine is a bisphosphine thereby allowing it to adopt a bidentate coordination to palladium. Preferred examples are those having the formula $(R^1)_2P-R^2-P(R^1)_2$ wherein the $R^1$ groups are independently $C_6$ to $C_{10}$ aromatic groups and $R^2$ is a divalent bridging group of formula $-(CH_2)_n-$ where n=2 to 8. The aromatic groups may optionally be substituted with polar groups such as $-OR^3$, $-SR^3$ and the like where $R^3$ is $C_1$ to $C_4$ alkyl. Preferred bisphosphines are those of formula $(Ph)_2P-(CH_2)_m-P(Ph)_2$ where Ph = phenyl and m = 2 to 6 or corresponding compounds where one or more of the phenyl groups are $C_1$ to $C_4$ alkoxy substituted. Mosts preferred bisphosphines are those wherein m = 2 to 4.

The catalyst employed in the process of the present invention can be generated in situ under the reaction conditions by charging sources of the three components to the polymerisation reactor. Alternatively it is possible to add a precursor palladium complex of formula $ZPd(OAc)_2$ or $ZPd(Q)_2^{2+}2X^-$ which has been prepared beforehand. In these formulae Z is either two monophosphines or the bisphosphine referred to above, X is the non- or weakly coordinating anion corresponding to component (b) above and Q is a weakly coordinating ligand such as a nitrile.

If the catalyst is to be prepared in situ in the polymerisation reactor then it is preferred that the molar ratio of phosphine to palladium charged is in the range 0.8:1 to 3.0:1 whilst the ratio of anion to palladium is in the range 2:1 to 500:1. Irrespective of how the catalyst is prepared it is preferred that the molar ratio of palladium to total olefin(s) to be polymerised is in the range $10^{-7}$ to 1 to $10^{-3}$ to 1.

It is a feature of the present invention that the polymerisation reaction is carried out in a solvent comprising either one or more $C_4$ to $C_{10}$ tertiary aliphatic alcohols or a mixture of one or more $C_4$ to $C_{10}$ tertiary aliphatic alcohols and up to 80% by volume of one or more aprotic solvents such as a $C_3$ to $C_{10}$ aliphatic ketone or a $C_4$ to $C_{10}$ cyclic aliphatic ether. If a mixture is employed it is preferred that the ketone or cyclic ether component comprises between 10 and 80% by volume, preferably between 30 and 70% by volume.

Examples of suitable tertiary aliphatic alcohols include tertiary butanol, tertiary amyl alcohol, 2-methylpentan-2-ol, 2-ethylbutan-2-ol 2-methylhexan-2-ol and the like with tertiary butanol and tertiary amyl alcohol being most preferred. Preferred aliphatic ketones include acetone, methyl ethyl ketone, diethyl ketone, ethyl propyl ketone, dipropyl ketone and methyl isobutyl ketone. Preferred cyclic aliphatic ethers include tetrahydrofuran and 1,4-dioxane.

The process of the present invention is suitably carried out by feeding one or more liquid streams, which in total comprise (1) the components for generating the catalyst or an independently prepared precursor palladium complex, (2) the solvent and (3) any liquid olefin(s) employed, to a polymerisation reactor together with gaseous streams in total comprising carbon monoxide and any gaseous olefins used. The polymerisation reactor is suitably maintained at a temperature in the range 40° to 150° C. preferably 50° to 110° C. most preferably 65° to 85° C. and at a pressure in the range 20 to 150 bars preferably 20 to 80 bars. It is preferred that the molar ratio of ethylene to carbon monoxide in the polymerisation reactor is in the range 4:1 to 1:4, preferably 2:1 to 1:2. The polymerisation reactor can be operated either batchwise or continuously.

The polyketone produced by the process defined above can be removed from the polymerisation reactor, separated from the reaction medium by filtration and washed with any suitbale solvent, e.g. tetrahydrofuran, methanol or acetone, in which it is not soluble.

The present invention is now illustrated by the following Examples. (dppp =diphenylphosphinopropane)
General Procedure for Preparing Polyketones Pd $(dppp)(O_2CCH_3)_2$ (0.0135 g, 0.02 mmol), hydrogen bis(5-chlorosalicylato)borate (1.4017 g, 3.78 mmol) propylene (27.1 g 0.64 mol), and the appropriate solvent or solvent mixture were mixed together in a 300 $cm^3$ mechanically stirred autoclave. An equimolar mixture of ethylene and carbon monoxide was introduced into the sealed autoclave such that the overall pressure was 33 bar gauge. The contents of the autoclave were then brought to 70° C. and the overall pressure adjusted to 50 bar gauge. These conditions were maintained for four hours by addition of more of the gaseous mixture as appropriate. The polymerisation reaction was terminated by releasing the pressure. The polymer produced was collected by filtration, washed with acetone and dried in vacuo. From the weight of product a productivity figure was calculated (g of polyketone/g of palladium/per hour). The intrinsic viscosity of the product, a measure of the molecular weight of the product, was also measured and recorded using standard method ASTM D2857-87.

EXAMPLES 1–6 AND COMPARATIVE TESTS A–D

The general procedure described above was carried out with a range of solvents. Details of the solvents used together with the catalyst productivities and intrinsic viscosities measured at 60° C. are given in Table 1.

TABLE 1

| Example/ Comparative Test | Solvent 1 | Volume ($cm^3$) | Solvent 2 | Volume ($cm^3$) | Productivity g · g $Pd^{-1}$ $hr^{-1}$ | Intrinsic Viscosity (dl · $g^{-1}$) |
|---|---|---|---|---|---|---|
| 1 | t-butanol | 65 | acetone | 35 | 1202 | 1.28 |
| 2 | t-butanol | 35 | acetone | 65 | 1400 | 1.59 |
| 3 | t-butanol | 100 | — | — | 897 | 1.49 |
| 4 | t-butanol | 35 | MEK | 65 | 1167 | 1.03 |
| 5 | t-butanol | 35 | THF | 65 | 822 | 1.15 |
| 6 | t-amyl alcohol | 35 | acetone | 65 | 1477 | 1.18 |
| A | acetone | 100 | — | — | 164 | 1.22 |
| B | methanol | 35 | acetone | 65 | 1009 | 0.66 |
| C | i-butanol | 35 | acetone | 65 | 640 | 0.72 |
| D | n-butanol | 35 | acetone | 65 | 719 | 0.67 |

EXAMPLES 7, 8 AND COMPARATIVE TEST E

The general procedure described above was used except that the propylene was omitted and 1.4 mmol of hydrogen bis (5-chlorosalicylato)borate was used. Details of the solvents used together with the catalyst productivities and intrinsic viscosities measured at 60° C. are given in Table 2.

TABLE 2

| Example/ Comparative Test | Solvent 1 | Volume ($cm^3$) | Solvent 2 | Volume ($cm^3$) | Productivity g · g $Pd^{-1}$ $hr^{-1}$ | Intrinsic Viscosity (dl · $g^{-1}$) |
|---|---|---|---|---|---|---|
| E | methanol | 100 | — | — | 794 | 0.56 |

TABLE 2-continued

| Example/ Comparative Test | Solvent 1 | Volume (cm³) | Solvent 2 | Volume (cm³) | Productivity g · g Pd⁻¹ hr⁻¹ | Intrinsic Viscosity (dl · g⁻¹) |
|---|---|---|---|---|---|---|
| 7 | t-butanol | 100 | — | — | 1195 | 6.77 |
| 8 | t-butanol | 35 | acetone | 65 | 2062 | 4.95 |

From the Examples and Comparative Tests given above it can be seen that a combination of high yields and high intrinsic viscosities (i.e. high molecular weights) are only obtained when the solvents of the present invention are employed.

I claim:

1. A process for preparing a polyketone comprising polymerising together carbon monoxide, ethylene and optionally at least one $C_3$ to $C_{10}$ alpha-olefin in the presence of a solvent and a catalyst composition derivable from a palladium salt, an anion which is either non-coordinating or weakly coordinating to palladium and a phosphine ligand characterised in that the solvent is either one or more $C_4$ to $C_{10}$ tertiary aliphatic alcohols or a mixture of one or more $C_4$ to $C_{10}$ tertiary aliphatic alcohols and up to 80% by volume of one or more aprotic solvents.

2. A process as claimed in claim 1 wherein the tertiary aliphatic alcohol is tertiary butyl alcohol.

3. A process as claimed in claim 1 wherein the tertiary aliphatic alcohol is tertiary amyl alcohol.

4. A process as claimed in either claim 1 or claim 2 wherein the aprotic solvent is either one or more $C_3$ to $C_{10}$ aliphatic ketone or one or more $C_4$ to $C_{10}$ cyclic aliphatic ether or a mixture thereof.

5. A process as claimed in either claims 1 or 2 wherein the aprotic solvent is acetone.

6. A process as claimed in either claims 1 or 2 wherein the aprotic solvent is methyl ethyl ketone.

7. A process as claimed in either claims 1 or 2 wherein the aprotic solvent is either tetrahydrofuran or 1,4-dioxane.

8. A process as claimed in either claim 1 or claim 2 wherein the solvent comprises between 10 and 80% by volume of the aprotic solvent.

9. A process as claimed in either claims 1 or 2 wherein the solvent comprises between 30 and 70% by volume of the aprotic solvent.

10. A process as claimed in either claims 1 or 2 wherein the polyketone comprises a terpolymer of carbon monoxide, ethylene and propylene.

11. A process as claimed in claim 1 wherein the solvent consists essentially of at least one $C_4$ to $C_{10}$ tertiary aliphatic alcohol.

12. A process for preparing a polyketone comprising polymerizing, together with carbon monoxide, ethylene and optionally at least one $C_3$ to $C_{10}$ alpha-olefin in the presence of a catalyst composition derivable from a palladium salt, an anion which is either non-coordinating or weakly coordinating to palladium, a phosphine ligand, and a solvent comprising a mixture of one or more $C_4$ to $C_{10}$ tertiary aliphatic alcohols and up to 80% by volume of one or more aprotic solvents.

13. A process as defined in claim 12 wherein the tertiary alcohol is tertiary butyl alcohol.

14. A process as defined in claim 13 wherein the tertiary alcohol is tertiary anamyl alcohol.

15. A process as defined in claim 12 wherein the aprotic solvent is either one or more $C_3$ to $C_{10}$ aliphatic ketones or one or more $C_4$ to $C_{10}$ cyclic aliphatic ethers or a mixture thereof.

16. A process as claimed in claim 12 wherein the aprotic solvent is acetone.

17. A process as claimed in claim 12 wherein the aprotic solvent is methyl ethyl ketone.

18. A process as claimed in claim 12 wherein the aprotic solvent is tetrohydrofuron or 1,4-dioxane.

19. A process as claimed in claim 12 wherein the solvent comprises between 10 and 80% by volume of the aprotic solvent.

20. A process as claimed in claim 12 wherein the solvent comprises between 30 and 70% by volume of the aprotic solvent.

21. A process as claimed in claim 12 wherein the polyketone comprises a terpolymer of carbon monoxide, ethylene and propylene.

* * * * *